016# United States Patent [11] 3,624,008

| [72] | Inventor | Adolfas Damusis |
| | | Detroit, Mich. |
| [21] | Appl. No. | 837,883 |
| [22] | Filed | June 30, 1969 |
| [45] | Patented | Nov. 30, 1971 |
| [73] | Assignee | BASF Wyandotte Corporation |
| | | Wyandotte, Mich. |

[54] CATALYST AND METHOD FOR THE POLYMERIZATION OF ETHYLENE OXIDE
9 Claims, No Drawings

[52] U.S. Cl. .................................................. 260/2 A, 252/431
[51] Int. Cl. ..................................................... C08g 23/14, C08g 23/06
[50] Field of Search .......................................... 260/2 EP, 2 A, 615, 80 C; 252/430

[56] References Cited
UNITED STATES PATENTS

| 3,037,943 | 6/1952 | Hill et al. ....................... | 260/2 |
| 3,062,755 | 11/1962 | Hill et al. ....................... | 260/2 |
| 3,127,358 | 3/1964 | Hill et al. ....................... | 260/2 |
| 3,214,387 | 10/1965 | Hill et al. ....................... | 252/431 |
| 3,382,192 | 5/1968 | Kawamura et al. ............ | 260/2 |
| 3,415,761 | 12/1968 | Vandenberg ................... | 260/2 |

*Primary Examiner*—William H. Short
*Assistant Examiner*—E. Nielsen
*Attorneys*—Cedric H. Kuhn, Robert E. Dunn, Bernhard R. Swick, Joseph D. Michaels and Charles G. Lamb

ABSTRACT: A novel catalytic system comprising (a) a divalent alkaline earth metal, (b) anhydrous ammonia and (c) an organic dioxide is used to polymerize ethylene oxide to hard, granulated polymers having a final average molecular weight of from about 1 million to 10 million. The polymers are prepared by contacting the ethylene oxide with a suspension comprising the catalyst system and a nonsolvent for the polymer, thereby forming low-molecular weight polymers which are then built up by the addition thereto of further amounts of the oxide.

CATALYST AND METHOD FOR THE POLYMERIZATION OF ETHYLENE OXIDE

The present invention relates to the production of high-molecular weight polymers of ethylene oxide. In one aspect, the present invention relates to novel catalysts useful in the polymerization of ethylene oxide. In another aspect, the present invention relates to a suspension polymerization method for polymerizing ethylene oxide which utilizes these novel catalysts.

According to the prior art, high-molecular weight polyethylene oxide, generally ranging in weight from 500,000 to several million, is prepared either by catalytically activated suspension polymerization processes or solution polymerization processes depending on the desired final form of the polymer, e.g., viscous liquid or solid suspended particles of polyethylene oxide. The catalysts normally used in such processes generally comprise metallo-organics modified with moisture, oxygen, alcohols; alkaline earth metal hexammoniates modified with dimethyl sulfoxides, triphenylmethane, olefin monoxides, and the like; or metallo-oxides, metallo-alkoxides, alkaline earth metal oxides, carbonates and the like. However, many factors negate the usefulness of the prior art catalysts and the methods generally associated therewith.

Of primary concern is the fact that the prior art catalysts impart a high residual ash content to the polymer, generally about 1 percent to 2 percent of the final weight of the polymer. Such high ash content, which results from the catalysts exhibiting a low catalytic efficiency, hinders the stability of the polymer while simultaneously tainting the color appearance thereof and causing precipitation of residual catalyst from solution. Of equal concern also is the fact that some polymerization processes using these prior art catalysts require high operating temperatures to effectuate the polymerization. In either event, the final form of the product, as noted, is either extremely viscous, wherein the processing is difficult and not economical, or the product is powdery in form, is difficult to filter and tends to agglomerate when forming solutions.

Accordingly, it is an object of the present invention to provide improved catalysts for polymerizing ethylene oxide which enable the production of consistently high-molecular weight polymers at an extremely fast rate of reaction. It is another object of the invention to provide catalysts which are effective in polymerizing ethylene oxide to obtain a high yield of polymer having a low ash content. Yet another object of the invention is to provide a novel suspension polymerization process for producing hard, granulated polyethylene oxide at operating temperatures below the softening point of the polymer. Still yet another object of the invention is to provide a novel suspension polymerization process employing the present catalysts. A further object of the invention is to provide a process for the polymerization of ethylene oxide which produces uniformly granulated polyethylene oxide which is easily processable, filterable by gravity and nonagglomerating in the process of dissolving the polymer in typical solvents therefor. It will be apparent to those skilled in the art that these and other objects are achieved from a consideration of the following detailed description of the present invention and specific embodiments thereof.

In accordance with one embodiment of the present invention, an extremely active, granulated, organometallic catalyst system is provided that is particularly useful for polymerizing ethylene oxide. The catalytic system comprises the product obtained by mixing (1) a divalent alkaline earth metal, (2) anhydrous liquid ammonia, and (3) an organic dioxide. Such a catalyst system, for reasons which are not entirely understood, has been found to be extremely active, and is useful not only in the process of the present invention, but is quite adaptable to the prior art processes as well. This novel catalyst is characterized by slow termination of its catalytic activity while promoting fast propagation of polymers from monomers in contact therewith.

The alkaline earth metals contemplated for use in this novel catalytic system are the divalent alkaline earth metals selected from the group consisting of magnesium, calcium, zinc, strontium and cadmium. Preferably, calcium is the alkaline earth metal employed.

The organic dioxides which are advantageously utilized with the alkaline earth metal and ammonia in the present system can be represented by the following formula:

$$O=R-R'=O$$

wherein R and R' are each, individually, saturated or unsaturated, aliphatic or alicyclic hydrocarbon radicals. Representative dioxides are, for example, when R and R' are both aliphatic, butadiene dioxide, pentadiene dioxide, hexadiene dioxide; dodecatriene dioxide and the like; when R and R' are both alicyclic radicals representative dioxides include, for example, dicyclobutadiene dioxide, dicyclopentadiene dioxide, dicyclohexadiene dioxide, and the like. Other suitable organic dioxides are those wherein R and R' are dissimilar, i.e., one is aliphatic and the other is alicyclic, such as, vinylcyclobutene dioxide, vinylcyclopentene dioxide, vinylcyclohexene dioxide, butenecyclobutene dioxide, butenecyclopentene dioxide, and the like; butadiene cyclobutadiene dioxide, butadiene cyclopentadiene dioxide, and the like; pentadiene cyclobutadiene dioxide and the like. Of the many suitable organic dioxides, dicyclopentadiene dioxide is preferred.

The catalyst system is prepared by dissolving, at a temperature ranging from about −60° C. to −33° C., preferably from about −40° C. to −33° C., the divalent alkaline earth metal in anhydrous liquid ammonia, and thereafter adding thereto the organic dioxide. After the addition is completed, the catalyst system is obtained by removing excess ammonia from the mixture. In preparing the catalyst system, from about 1 to 20 parts by weight of ammonia per part by weight of metal, preferably from 3 to 15 parts of ammonia per part by weight of metal; and from 0.25 to 3, preferably from 0.35 to 1.7 parts, by weight of metal per part by weight of dioxide is employed.

It has been observed that the particle size of the present catalyst system has a beneficial influence on both the rate of polymerization of monomers in contact therewith as well as on the final molecular weight of the polymer. Specifically, an agglomerated or a granulated rather than a loose powdery-type catalyst system is preferred. Obtaining a system in this physical form is achieved by introducing into the catalytic system, prior to removal of the excess ammonia, and preferably prior to the addition of the metal to the ammonia, from about one to five parts by weight of the metal, of a granulating agent, which is a non-solvent for the system. The granulating agent promotes agglomeration or granulation of the catalyst. As noted, catalyst systems in this physical form are more catalytically efficient than those produced in the absence of the granulating agent. Granulating agents contemplated herein include aliphatic, alicyclic, and aromatic normally liquid hydrocarbons such as the pentanes, the hexanes, the heptanes, the octanes, the decanes, cyclopentane, cyclohexane, cycloheptane, benzene, toluene, xylenes, and the like.

Excess ammonia is removed by venting or permitting the temperature of the system to rise to at least −33° C., the boiling point of ammonia. Any remaining traces of ammonia are thereafter removed by heating the system, for example, to about 40° C., while applying a vacuum of about 50 mm. Hg. Alternatively, any remaining traces of ammonia can be removed by heating the system to about 40° C. and thereafter applying a vacuum of about 50 mm. Hg. at a lower temperature, for example, of about 30° C. The ammonia removed by these procedures can be recovered and reused to produce further amounts of the catalyst system.

The final product ranges in color from a pink tinged blue to a dark grap depending on the particular alkaline earth metal and organic dioxide utilized and the degree of granulation.

It has been found that catalysts prepared in accordance with the above procedure, besides exhibiting utility in solution polymerization processes, are extremely valuable in suspension polymerization processes and even more valuable in the novel suspension polymerization method of the present invention, which is described in detail below. Generally speaking, when used in the suspension polymerization method of the present invention, these catalysts provide a means for polymerizing ethylene oxide at relatively low temperatures of about 10° C. to 55° C., preferably around 25° C. to 40° C. Moreover, when these catalysts are used in the process of the present invention, induction periods before commencement of the polymerization are reduced significantly without requiring the application of external heat. Also, because of their extraordinary catalytic activity, unusually low amounts of the catalyst, from about 0.01 percent to 1.00 percent by weight of the metallic constituent in the catalyst based on the weight of the monomer, are all that are required to provide high yields of polymer. Generally, from 200 to 800 parts by weight of polymer per part by weight of metal in the catalyst system are obtained.

The polymers produced in accordance with the present invention have been found to have an average molecular weight of from about one million to ten million. Because of the high yields obtained, the high-molecular weight polymers of the present invention have an extremely low ash content, ranging usually from 0.10 percent to 0.25 percent by weight of the polymer. The high yields are undoubtedly attributable to the slow termination and fast propogation properties of the catalysts. Additionally, the resulting polymers are evenly granulated and require no grinding prior to processing. Furthermore, the polymers have no fine powdery fraction and therefore do not agglomerate while dissolving in a solvent.

The advantages and improvements in polymerization processes attributable to the present catalyst system were quite unexpected since the heretofore known alkaline earth metal based polymerization catalysts are inherently of weaker catalytic activity. Usually, the prior art requires from 3 to 4 times more catalyst than that required by the present invention to obtain yields comparable to those obtained herein. Because of the catalyst requirement, the prior art polymers prepared therefrom usually have a higher ash content, generally about 1 percent to 2 percent of the total weight of the polymer.

Now, in accordance with another embodiment of the present invention, there is provided a novel method for the polymerization of ethylene oxide which preferably employs the catalysts of the present invention. The present method generally comprises a suspension polymerization process whereby ethylene oxide is initially polymerized to form low molecular weight polymers which are built up by adding on to the polymers further amounts of the oxide. The process is conducted in a suspension comprising (a) catalytically sufficient quantities of the present catalyst system and (b) a nonsolvent for the polymers, and at low temperatures ranging from about 10° C. to 55° C.

In a specific embodiment of the present method there is provided a two-step "heavy" suspension polymerization process conducted in an atmosphere purged of oxygen and/or moisture, preferably a nitrogen atmosphere, wherein, initially, monomeric ethylene oxide is catalytically pregranulated to form nucleates or prepolymers and thereafter, the nucleates or prepolymers are built up and further polymerized to provide final polymers of ethylene oxide having an average molecular weight of from about one million to ten million.

The first stage of the method, which provides for the nucleation or granulation of monomeric ethylene oxide into prepolymers or nucleates of ethylene oxide, is accomplished by introducing ethylene oxide into a suspension comprising (1) catalytically effective quantities of the catalyst system, generally from 0.01 percent to 1.00 percent, preferably 0.05 percent to 0.2 percent, by weight of the metallic component of the catalyst, based on the total weight of the monomer added during the process of polymerization and (2) sufficient amounts of a nonsolvent for the polymer to ensure the presence of an excess thereof. The use of a nonsolvent (sometimes referred to as a diluent) for suspension polymerization processes is well known in the art. The predominant reason for its use is that it promotes nucleation or granulation of the oxide polymers, thereby inhibiting the agglomeration of the polymers, because the monomer is soluble in the nonsolvent and the polymer is not. When a nonsolvent is used conjointly with the catalyst system of the present invention, hard sandlike granules, or nuclei, are produced from monomers in contact therewith. This again, as noted, provides a distinct improvement over prior art suspension polymerization techniques wherein fluffy granules, which are not easily processed, are produced.

The nonsolvents contemplated herein are the normally liquid hydrocarbons. Examples of such compounds are alkanes, such as the butanes, the pentanes, the hexanes, the heptanes, the octanes, the decanes and the like; cycloalkanes, such as cyclohexane, cycloheptane, and the like; aromatic hydrocarbons, such as benzene, toluene, decahydronaphthalene and the like; as well as various other well known nonsolvents. Among the various suitable nonsolvents, pentane, hexane and heptane are preferred.

The monomeric ethylene oxide can be brought into contact with the suspension by any conventional means, such as, by bubbling it into the suspension or the like, and in any convenient fluid phase, i.e., either as a liquid or as a gas, preferably as a liquid. Generally from about five to 50 parts by weight of the monomer per part by weight of metal in the catalyst is initially brought into contact with the suspension. Nucleation of the monomer is carried out under continuous reflux which maintains low operating temperatures, ranging from 10° to 55° C., preferably from 25° to 40° C., which is well below both the melting point of the polymer and the boiling point of the nonsolvent.

After the nearly instantaneous induction period has elapsed, nucleation occurs. Either as soon as the nucleates are formed or after the initial charge of ethylene oxide is completely consumed, the polymer build up stage of the process is commenced. This is achieved by continuously introducing a feed stream of the monomer to the nucleate-containing suspension, which may have additional amounts of the nonsolvent added thereto to keep the polymer in a granulated, stirrable state.

The second step of the process is the "heavy suspension" stage of the process. By "heavy suspension" is meant that the polymers which are being built up are maintained in an amount of nonsolvent just sufficient to barely wet the polymers, i.e., to provide an appearance to the polymer analogous to wet sand, and to keep the polymers only partially submerged in the suspension and the monomer. This use of a heavy suspension provides a two-fold advantage over other processes, namely, prolongs the catalytic life of the catalyst system and enables the production of higher molecular weight polymers.

As in the first stage, refluxing the excess monomer is necessary to maintain the operative temperature since the polymerization reaction occurring in the second stage is also quite exothermic. In this second stage, generally from about 4.4 parts by weight to 11 parts by weight of monomeric ethylene oxide per part by weight of metal in the catalyst per minute is continuously fed to the suspension to insure the presence of an excess amount of the monomer. During the second stage of the process, simultaneous with the building up of the initially formed nucleates is the formation of further nucleates which in turn begin to polymerize upon contact with the monomer. Hence, the second stage of the process is seen to comprise in addition to the building up of the initially formed nucleates the continuous formation of further nucleates, which in turn are built up throughout the duration of the second step. This simultaneous occurrence of nucleation and building of the nucleates into final polymers continues until either the catalytic activity of the catalyst is diminished or until the desired molecular weight of the polymer is attained.

It has been observed that during the building up of the nucleates, the polymers formed thereby may sometimes tend to fuse together or agglomerate. By applying agitation, such as by stirring or the like, any agglomerates can be broken into small particles which can be kept in the heavy suspension and further polymerized.

The polymers obtained by this process are discrete, hard, sandlike, granulated polymer particles having an extremely white color.

The following examples, which are not to be construed as being unduly limitative of the invention illustrate the various embodiments thereof. In the examples, all parts, unless otherwise indicated, are by weight.

A. PREPARATION OF CATALYST

EXAMPLE I

Forty parts of purified calcium metal turnings and 80 parts of n-hexane were charged to a glass-lined reactor, equipped with a stirrer and cooling assembly. Prior to the addition of these materials, the reactor was purged with nitrogen to remove any oxygen and/or moisture present therein. The cooling assembly maintained the reactor at −40° C. to −60° C. Thereafter, 408 parts of liquified dry anhydrous ammonia gas was charged to the reactor. After stirring the mixture for 15 minutes, 70 parts of dicyclopentadiene dioxide, dissolved in 70 parts of benzene, was slowly added with stirring to the mixture. After the addition of the dioxide was completed, the contents of the reactor was stirred for 30 minutes at −40° C. The excess of ammonia was removed by boiling it off at −33° C. The residue in the reactor consisted of a solid suspended in the remaining excess liquid ammonia. Additional ammonia was then removed and recovered by heating the reactor with a water bath to room temperature and thereafter to 40° C. The sandlike product left in the reactor consisted of 114 grams of the catalyst and traces of liquid ammonia. By applying a vacuum of about 50 mm. Hg. at 30° C. to the reactor the final traces of ammonia were removed and a granulated product was obtained.

The gray tinged product, the catalyst system, which was pyrophoric, was maintained in a safe, storable state by suspending it in a 50 percent suspension comprising the catalyst system and n-hexane. The suspension was prepared by adding 114 parts of n-hexane to the 114 parts of catalyst remaining in the reactor.

The concentration of calcium in the suspension was determined by dividing the total amount of the suspension into the total amount of calcium reagent, i.e., $$\frac{40 \text{ parts calcium}}{228 \text{ parts suspension}} = \frac{1 \text{ part calcium}}{5.7 \text{ parts suspension}}$$

EXAMPLE II

The procedure of example I was followed except that 400 parts of ammonia and 80 parts of n-hexane as a granulating agent were utilized. The organic dioxide employed consisted of 100 parts of vinylcyclohexene dioxide. One hundred and forty four parts of catalyst was recovered. Thereafter, 144 parts of n-heptane was added to the catalyst to form a 50 percent suspension.

The concentration of calcium in the suspension consisted of one part calcium per 7.2 parts of suspension which was determined by dividing the total weight of the suspension into the total weight of calcium reagent, i.e., $$\frac{40 \text{ parts calcium}}{288 \text{ parts suspension}} = \frac{1 \text{ part calcium}}{7.2 \text{ parts suspension}}$$

EXAMPLE III

To a 1,000 ml. Parr bomb disposed in an ice-acetone bath maintained at −40° C., was charged 20 parts of calcium metal, 300 parts of liquified dry anhydrous ammonia gas, 75 parts of n-hexane and 42 parts of dicyclopentadiene dioxide dissolved in 42 parts of toluene. After 30 minutes the bomb was removed from the ice-acetone bath and ammonia was removed for 1 hour at −33° C. Thereafter, the bomb was placed in a water bath for 1 hour and at a temperature of 0° C. After the 1 hour elapsed, traces of ammonia were removed from the bomb by applying a vacuum and the temperature of the bomb was then elevated to room temperature. Seventy parts of a powderery catalyst was recovered from the bomb. The catalyst was then slurried with 70 parts of n-hexane to provide a 50 percent suspension.

The concentration of catalyst in the suspension was one part calcium per seven parts of suspension.

EXAMPLE IV

Following the procedure of example I, 87.63 parts of strontium metal suspended in 120 parts of heptane was dissolved in 400 parts of liquid ammonia. Thereafter, 83 parts of dicyclopentadiene dioxide dissolved in 83 parts of benzene was added to the reactor. After removing excess ammonia by the hereinbefore described procedure, the final product recovered consisted of 176.6 parts of granular catalyst. The catalyst was suspended in 176.6 parts of n-heptane to form a 50 percent suspension. The concentration of strontium metal in the suspension was four parts of suspension per one part of strontium.

B. POLYMERIZATION

EXAMPLE V

A tightly closed reactor equipped with refluxing apparatus, stirrer, and cooling jacket was blanketed with a nitrogen atmosphere and purged of oxygen and/or moisture. Six hundred parts of n-hexane and 31.2 parts of the 50 percent catalytic suspension of example I (5.47 parts of calcium) were charged to the reactor. Thereafter, 132 parts of monomeric ethylene oxide was added to the reactor and a vigorous reaction, the nucleation stage, began. By slowly stirring the contents of the reactor, the intensity of the reaction was minimized. The heat evolved from this exothermic reaction was removed by refluxing the monomer, which additionally, enabled this stage to proceed at about 17° C. After 10 minutes, crystalline particles of polyethylene oxide, the nucleates, were formed and all the ethylene oxide was consumed. Two hundred parts of n-hexane was added, with stirring, to the reactor to maintain the nucleates in the suspension.

After the nucleates were formed, a continuous feed of monomeric ethylene oxide was introduced into the reactor at a rate of 7.7 parts of ethylene oxide per minute per part of calcium in the catalyst. By keeping the monomer under reflux, the heat evolved was kept to a minimum and the temperature was maintained at about 28° C. By avoiding an excessive amount of supernatent liquid a granular polymer was formed. The granular polymer was just barely wetted and only partially submerged in the blend of the suspension and unreacted ethylene oxide. After about 2½ hours, the catalytic activity of the catalyst diminished and the feed of ethylene oxide was terminated, but the unreacted ethylene oxide continued to react to completion. A mi..or amount of n-hexane was added at this point in order to facilitate the stirring of the heavy suspended granules. After the completion of the reaction, n-hexane was strained by gravity and then stripped from the reactor by applying a vacuum at a temperature of 30° C. to 35° C. A total of 3,930 parts of a white, granulated sandlike polymer was recovered. This corresponds to a yield of 725 parts of polymer per part of calcium in the catalyst. When subjected to a screen test, the product gave the following results:

| Screen | Size of Sieve Openings. | Percentage of Polymer Retained |
| --- | --- | --- |

| No. | In Microns | on Screen |
|---|---|---|
| 10 or less | 2000 or greater | 38.5 |
| 10–20 | 2000–840 | 30.0 |
| 20–40 | 840–420 | 16.0 |
| 40 and above | 420 and less | 15.5 |

The average molecular weight of the polymer obtained by this process was determined by intrinsic viscosity using a Cannon-Fenske-Ostwald No. 100 viscometer by measuring the viscosities of 0.25 percent and 0.125 percent water solutions and extrapolating to zero concentrations. The molecular weight was then calculated by the equation:

$$M^a = \frac{[\eta]}{K \times 10^{-4}} \text{ (Huygen's Formula)}$$

wherein $\eta$ is the intrinsic viscosity, M is the molecular weight and $a$ and K are known constants for polyethylene oxide, namely, 0.78 and 1.25, respectively.

The average weight determined in accordance with this equation for the granulated polymers prepared from this example was determined to be 3,460,000. The ash content of the product consisted of 0.2 percent by weight of the polymer yield.

EXAMPLE VI

The procedure of example V was followed except that the catalyst employed was that of example IV. In carrying out the preparation of a polymer in this example, 300 parts of n-hexane and 200 parts n-pentane along with 80 parts of 50 percent catalyst suspension were charged to the reactor. The same effects as described in example V were observed. The temperature of the reactor vessel was maintained at about 17° C. for the nucleation stage and at about 28° C. for the build up stage. The product, white polymeric granules, when tested for screen size gave the following results:

| Screen Number | Size of sieve openings in microns | Molecular Weight | Percentage of polymers retained on screen |
|---|---|---|---|
| 10 | 2,000 | 7,002,000 | 48 |
| 10 to 20 | 2,000 to 840 | 5,345,000 | 42 |
| 20 to 40 | 840 to 420 | 4,340,000 | 9 |
| 40 and above | 420 and less | | 1 |

The average molecular weight, which was calculated in the same manner as in example V, was determined to be 6,310,000. The yield of polymer from the above process was 4600 parts or 230 parts by weight of polymer per part by weight of strontium in the catalyst. The ash content was 0.5 percent by weight of the polymer yield.

EXAMPLE VII

In this example, a catalyst similar to that of example I was utilized except that the dicyclopentadiene dioxide employed herein was purified by recrystallation of the dioxide from ethanol, and the concentration of calcium metal in the suspension was one part of calcium metal per 6.6 parts of a 50 percent suspension.

The polymerization process was conducted by following the procedure of example V. One hundred parts of n-hexane and 4.0 parts of the 50 percent catalytic suspension were charged into the reactor. Thereafter, 22 parts of ethylene oxide was introduced into the reactor which, by refluxing the ethylene oxide, was maintained at a temperature of about 17° C. The nucleates formed thereby were hard discrete particles consisting of agglomerates of small crystals of polyethylene oxide. By gentle stirring and continuous addition of n-hexane, the small nuclei were retained in the suspension until all the ethylene oxide was consumed. Thereafter the continuous addition of monomeric ethylene oxide was begun and the temperature of the reaction vessel was maintained at a temperature ranging from 25° C. to 32° C. In carrying out this procedure, the amount of n-hexane added was just sufficient to keep the polymeric granules wetted in order to be stirrable. After 3 hours, the catalytic activity of the catalyst ceased and the addition of the ethylene oxide was halted. After first straining off n-hexane by gravity and then stripping out the remaining n-hexane under vacuum at about 30° to 35° C., the final granulated polymers, 439 parts thereof, or 725 parts by weight of polymer per part by weight of calcium in the catalyst were white, sandlike discrete particles of matter.

The average molecular weight calculated from intrinsic viscosity data was determined to be 6,700,000. The ash content of the product consisted of 0.2 percent by weight of the polymer yield.

I claim:

1. In the polymerization of ethylene oxide, the improvement comprising: conducting said polymerization in the presence of a catalyst system prepared by the method comprising:
    a. dissolving a divalent metal selected from the group consisting of calcium and strontium in anhydrous liquid ammonia, and
    b. adding thereto an organic dioxide selected from the group consisting of dicyclopentadiene dioxide and vinylcyclohexane dioxide.

2. A process for the suspension polymerization of ethylene oxide to a high molecular weight polymer comprising the steps of:
    a. contacting said oxide at a temperature in the range of about 10° C. to 55° C. with a suspension comprising a nonsolvent for said polymer and a catalyst system, thereby forming nucleates of said oxide, said nucleates being maintained in said suspension and said catalyst system comprising a product prepared by (1) dissolving a divalent metal selected from the group consisting of calcium and strontium in anhydrous liquid ammonia, and (2) adding an organic dioxide selected from the group consisting of dicyclopentadiene dioxide and vinylcyclohexane dioxide, and thereafter
    b. adding further amounts of said oxide to said suspension so that said oxide adds on to said nucleates to form high molecular weight polymers.

3. The method of claim 1 wherein said divalent alkaline earth metal is calcium.

4. The method of claim 1 wherein said organic dioxide is dicyclopentadiene dioxide.

5. The method of claim 1 wherein said organic dioxide is vinylcyclohexene dioxide.

6. The method of claim 1 wherein said divalent alkaline earth metal is strontium.

7. The method of claim 1 wherein said polymerization is carried out at a temperature ranging from about 10° C. to 55° C.

8. The process of claim 2 wherein step (b) is conducted in the presence of a sufficient amount of said nonsolvent to maintain said polymers in a wetted and stirrable state.

9. The process of claim 2 wherein said nonsolvent is n-hexane.

* * * * *